United States Patent
Arakawa

[19]

[11] Patent Number: 6,072,188
[45] Date of Patent: Jun. 6, 2000

[54] RADIATION IMAGE INFORMATION RECORDING AND REPRODUCING SYSTEM

[75] Inventor: Satoshi Arakawa, Kanagawa-ken, Japan

[73] Assignee: Fuji Photo Film Co., Ltd., Kanagawa-ken, Japan

[21] Appl. No.: 08/974,669

[22] Filed: Nov. 19, 1997

[30] Foreign Application Priority Data

Nov. 26, 1996 [JP] Japan ................................ 8-314757

[51] Int. Cl.$^7$ .............................. G03B 42/02; G21K 1/00
[52] U.S. Cl. ..................... 250/582; 250/590; 250/588; 378/155
[58] Field of Search ................................. 250/590, 581, 250/582, 583, 585, 589, 584; 378/154, 155, 147, 150, 151, 152, 153

[56] References Cited

U.S. PATENT DOCUMENTS

| | | | |
|---|---|---|---|
| 4,380,086 | 4/1983 | Vagi ............................................ | 378/155 |
| 4,542,521 | 9/1985 | Hahn et al. ............................... | 378/155 |
| 5,081,355 | 1/1992 | Miyagawa et al. ...................... | 250/582 |
| 5,365,076 | 11/1994 | Itakura ...................................... | 250/582 |

FOREIGN PATENT DOCUMENTS 56-11395  2/1981  Japan .

*Primary Examiner*—Constantine Hannaher
*Assistant Examiner*—Albert Gagliardi
*Attorney, Agent, or Firm*—Sughrue, Mion, Zinn, Macpeak & Seas, PLLC

[57] ABSTRACT

A radiation image recording and reproducing system includes a conveyor which conveys a stimulable phosphor sheet along a predetermined circulation passage in an image recording section which is disposed on the circulation passage and records a radiation image of an object on the stimulable phosphor sheet by exposing the stimulable phosphor sheet to radiation through the object. At least one grid is provided in the image recording section and the position of the stimulable phosphor sheet in the image recording section relative to the grid with respect to the projecting direction in which the radiation is projected onto the stimulable phosphor sheet upon recording of the radiation image of the object is changed according to the amount of radiation to be scattered by the object.

4 Claims, 4 Drawing Sheets

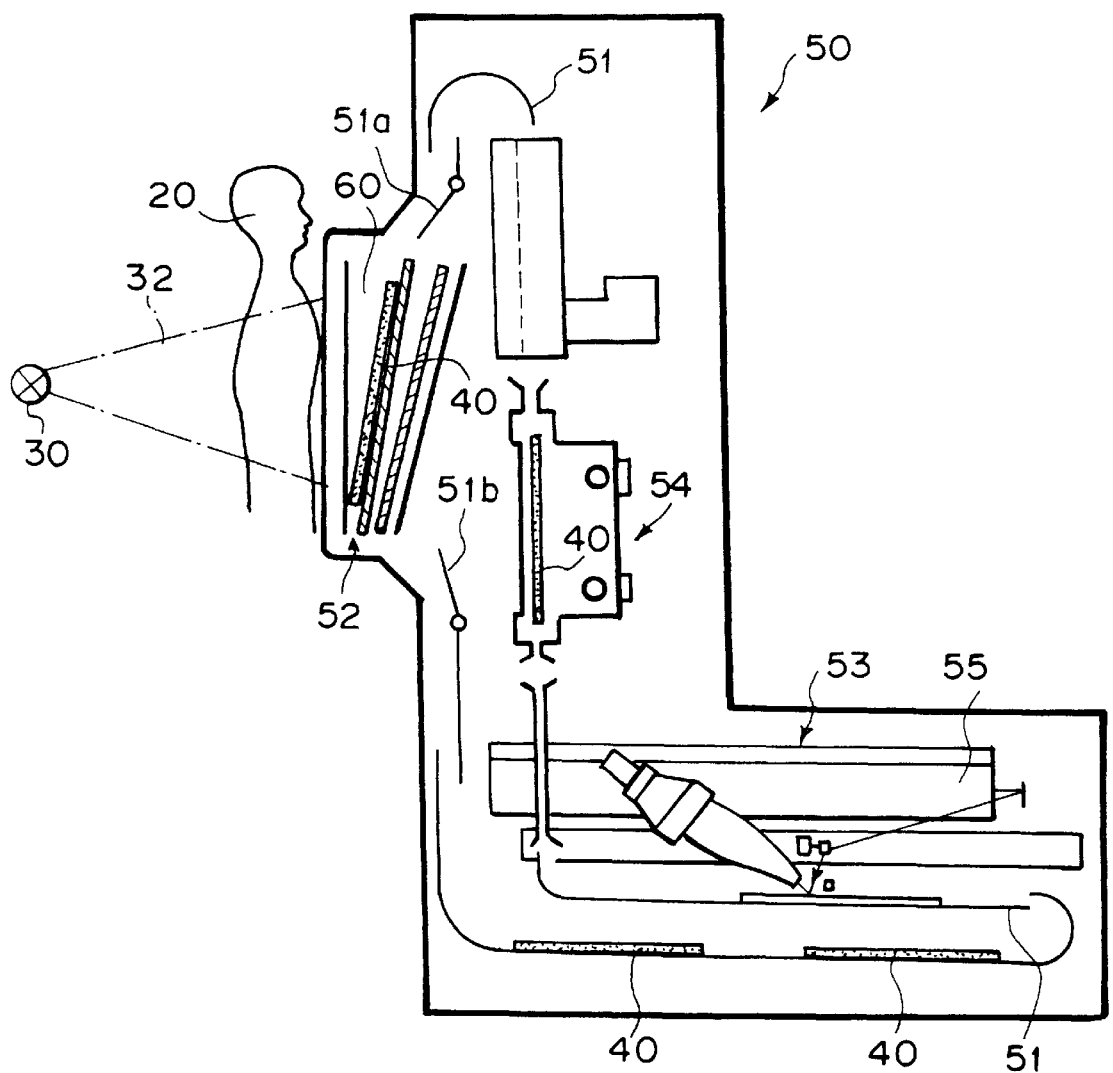
F I G .1

RADIATION IMAGE INFORMATION RECORDING AND REPRODUCING SYSTEM

BACKGROUND OF THE INVENTION

1. Field of the Invention

This invention relates to a radiation image information recording and reproducing system, and more particularly to a radiation image information recording and reproducing system in which a grid is employed to suppress influence of scattered rays.

2. Description of the Related Art

There has been put into practice in various fields a radiation image information recording and reproducing system in which a radiation image recorded on a recording medium is read out, thereby obtaining an image signal representing the radiation image, a suitable image processing is carried out on the image signal and a visible image is reproduced on the basis of the processed image signal. For example, in a radiation image recording and reproducing system disclosed in U.S. Pat. Nos. 4,258,264; 4,276,473; 4,315,318; 4,387,428; and Japanese Unexamined Patent Publication No. 56(1981)-11395 and the like, a radiation image of an object, such as a human body, is recorded on a stimulable phosphor sheet, the stimulable phosphor sheet is then exposed to stimulating rays, such as a laser beam, which scan the stimulable phosphor sheet and cause it to emit light in proportion to the amount of energy stored thereon during its exposure to the radiation, the light emitted by the stimulable phosphor sheet, upon stimulation thereof, is photoelectrically detected and converted into an electric image signal, and a visible radiation image of the object is reproduced on a recording material such as photographic material or on a display device such as a cathode ray tube (CRT) display device on the basis of the electric image signal. The stimulable phosphor sheet is a sheet material bearing thereon a layer of a stimulable phosphor. When certain kinds of phosphors are exposed to radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as "a stimulable phosphor".

The system is advantageous in that a radiation image which has a wide latitude and an excellent readability can be obtained.

Further we have proposed a radiation image information recording and reproducing system comprising a conveyor means which conveys a stimulable phosphor sheet along a circulation passage, an image recording section which is disposed on the circulation passage and records a radiation image of an object on the stimulable phosphor sheet, an image read-out section which is disposed on the circulation passage and reads out the radiation image stored on the stimulable phosphor sheet, and an erasing section which is disposed on the circulation passage and releases residual radiation energy remaining on the stimulable phosphor sheet after read-out of the radiation image so that the stimulable phosphor sheet can be repeatedly used. See, for instance, U.S. Pat. No. 4,851,679 and Japanese Unexamined Patent Publication No. 3(1991)-238441.

Further, in such a radiation image information recording and reproducing system, a grid is sometimes provided between the recording medium such as a stimulable phosphor sheet and the object in order to prevent radiation scattered by the object from impinging upon the recording medium when a radiation image of the object is recorded on the recording medium. The grid is in the form of a plate which has a certain thickness and comprises a plurality of strip-like regions which are formed of a material such as aluminum which prevents passage of scattered radiation and of a width substantially equal to that of one picture element and a plurality of strip-like regions which are formed of a material such as carbon which is apt to transmit the radiations and of a width substantially equal to that of one picture element, the two kinds of strip-like regions being arranged alternately.

When a radiation image is recorded by the use of such a grid, radiation scattered by the object in directions deviated from the direction in which the recording radiation is projected onto the object cannot impinge upon the recording medium, whereby the contrast of the radiation image of the object can be improved.

However depending upon the kind of the object, the influence of the scattered rays on the radiation image is less. For example, in the case of an object such as a limb which does not contain a complicated organ and is relatively small in thickness, the influence of the scattered rays on the contrast of the radiation image thereof is less and accordingly it is not necessary to use a grid. In contrast, in the case of an object such as the chest or the abdomen which contains complicated organs, a large amount of radiation is scattered and accordingly a grid must be used.

Thus there has been a demand for a system in which a radiation image can be selectively recorded using or not using a grid.

In the aforesaid conventional radiation image recording and reproducing system, though the grid is removable, the user seldom removes the grid in order to record a radiation image without the grid since the grid is large in both size and weight.

That is, the grid of the radiation image recording and reproducing system is kept on the recording and reproducing system and recording which may be effected without use of the grid is generally effected by another system without grid.

SUMMARY OF THE INVENTION

In view of the foregoing observations and description, the primary object of the present invention is to provide a radiation image recording and reproducing system in which recording with use of a grid and that without use of a grid can be easily switched from one to the other.

The radiation image recording and reproducing system in accordance with the present invention is characterized in that the position of a stimulable phosphor sheet relative to a grid in the image recording section can be changed by changing the carrying-in position of the stimulable phosphor sheet where the stimulable phosphor sheet is carried in the recording section, and/or changing the position of the grid.

That is, in accordance with the present invention, there is provided a radiation image recording and reproducing system comprising a conveyor means which conveys a stimulable phosphor sheet along a predetermined circulation passage; an image recording section which is disposed on the circulation passage and records a radiation image of an object on the stimulable phosphor sheet by exposing the stimulable phosphor sheet to radiation through the object; an image read-out section which is disposed on the circulation passage and comprises a stimulating light source for emitting stimulating light which scans the stimulable phosphor sheet having been exposed to the radiation to cause it to emit light in proportion to the amount of energy stored thereon during its exposure to the radiation, and a photoelectric read-out means which reads out the light emitted by the stimulable phosphor sheet upon stimulation thereof by the stimulating light, thereby obtaining an electric image signal representing a radiation image of the object; and an erasing section which is disposed on the circulation passage and releases residual radiation energy remaining on the stimulable phosphor sheet after read-out of the radiation image and before another radiation image is recorded thereon, wherein the improvement comprises at least one grid provided in the image recording section and a relative position changing means which changes the position of the stimulable phosphor sheet in the image recording section relative to said at least one grid with respect to the projecting direction in which the radiation is projected onto the stimulable phosphor sheet upon recording of the radiation image of the object.

The "position of the stimulable phosphor sheet in the image recording section relative to said at least one grid with respect to the projecting direction" means the order in which the stimulable phosphor sheet and said at least one grid are arranged from the side of the object. That is, when only one grid is provided, the grid can be positioned either upstream or downstream of the stimulable phosphor sheet as seen in the projecting direction of the radiations. When a pair of grids are provided, there are three orders. In one order, one grid is positioned upstream of the stimulable phosphor sheet with the other grid positioned downstream of the same. In another order, both the grids are positioned upstream of the stimulable phosphor sheet. In the other order, both the grids are positioned downstream of the stimulable phosphor sheet.

Depending on the relative position of the grid(s) and the stimulable phosphor sheet, the amount of scattered radiation which can impinge upon the stimulable phosphor sheet differs. That is, when there is no grid upstream of the stimulable phosphor sheet, the scattered radiation can impinge upon the stimulable phosphor sheet without being removed nor absorbed. When one grid is upstream of the stimulable phosphor sheet, the scattered radiation is partly removed or absorbed by the grid and a small amount of scattered radiation impinges upon the stimulable phosphor sheet. When a pair of grids are upstream of the stimulable phosphor sheet, almost all the scattered radiation is removed or absorbed by the grids and the scattered radiation hardly impinges upon the stimulable phosphor sheet.

The relative position of the grid(s) and the stimulable phosphor sheet can be changed by changing the carrying-in position of the stimulable phosphor sheet where the stimulable phosphor sheet is carried in the recording section, or changing the position of the grid(s) in the image recording section, or changing both of them. However since the grid is formed of a relatively hard material and accordingly has less degree of freedom of movement whereas the stimulable phosphor sheet is formed of a flexible material and accordingly the carrying-in position of the stimulable phosphor sheet can be changed relatively freely, it is preferred that the relative position of the grid(s) and the stimulable phosphor sheet be changed by changing the carrying-in position of the stimulable phosphor sheet.

In this case, the image recording section is arranged so that the stimulable phosphor sheet can be carried in the image recording section in one of a plurality of carrying-in positions and the relative position changing means includes a selection means which selects one of the carrying-in positions.

When the relative position changing means changes the relative position of the grid(s) and the stimulable phosphor sheet according to the amount of scattered radiation, removal of the scattered radiation can be effected according to the kind of the object.

When a pair of grids are provided, it is preferred that the grids be positioned so that the strip-like regions of one of the grids extend substantially perpendicular to those of the other grid.

In the radiation image recording and reproducing system of the present invention, recording with use of a grid and that without use of a grid can be easily switched from one to the other by changing the relative position of the grid(s) and the stimulable phosphor sheet according to the kind of object, whereby the amount of radiation which impinges upon the stimulable phosphor sheet can be adjusted so that a radiation image having an adequate contrast can be obtained.

BRIEF DESCRIPTION OF THE DRAWINGS

FIG. 1 is a schematic view showing a radiation image recording and reproducing system in accordance with an embodiment of the present invention.

DESCRIPTION OF THE PREFERRED EMBODIMENTS

Figure 2:
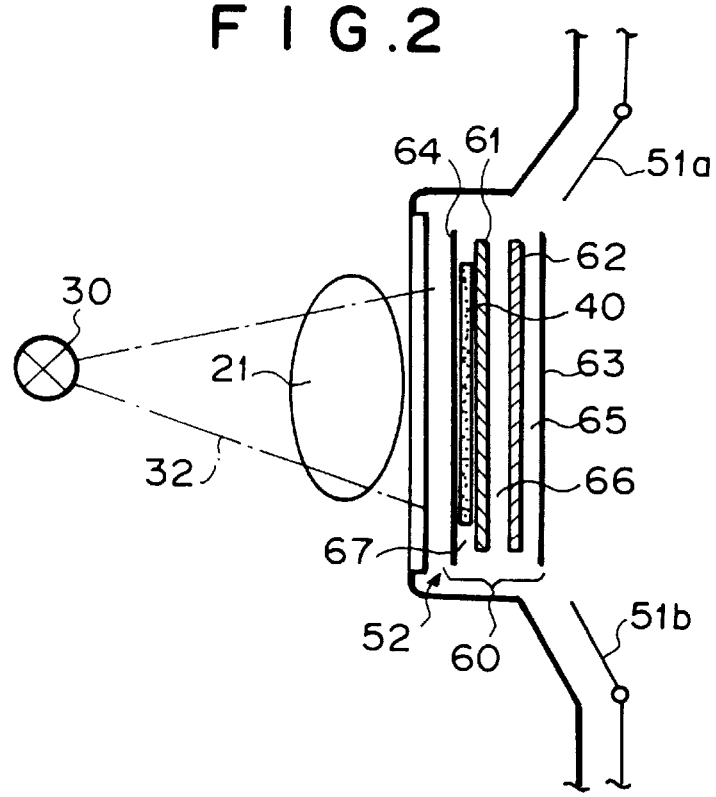
FIG. 2 is a fragmentary view showing the image recording section of the radiation image recording and reproducing system shown in FIG. 1.

In FIG. 1, a radiation image recording and reproducing system 50 in accordance with an embodiment of the present invention comprises a conveyor means 51 which conveys a stimulable phosphor sheet 40 along a circulation passage. An image recording section 52 is disposed on the circulation passage. The image recording section 52 is provided with a sheet receiving section 60 which receives the stimulable phosphor sheet 40 conveyed along the circulation passage. The image recording section 52 records a radiation image of an object 20 on the stimulable phosphor sheet 40 by projecting radiation 32, emitted from a radiation source 30, onto the stimulable phosphor sheet 40 through the object 20. An image read-out section 53 is disposed on the circulation passage. The image read-out section 53 is provided with a stimulating light source 55 for emitting stimulating light which scans the stimulable phosphor sheet 40 having been exposed to said radiation to cause it to emit light in proportion to the amount of energy stored thereon during its exposure to the radiation. The image read-out section 53 is further provided with a photoelectric read-out means which reads out the light emitted by the stimulable phosphor sheet 40 upon stimulation thereof by the stimulating light, thereby obtaining an electric image signal representing the radiation image of the object 20. Further an erasing section 54 is disposed on the circulation passage and releases residual radiation energy remaining on the stimulable phosphor sheet 40 after read-out of the radiation image and before another radiation image is recorded thereon.

The sheet receiving section 60 of the image recording section 52 comprises first and second grids 61 and 62 which are stood substantially perpendicular to the direction of travel of the radiation 32 passing through the object 20 as shown in FIG. 2, and front and rear sheet holding members 64 and 63 which are disposed upstream and downstream of the grids 61 and 62. The grids 61 and 62 and the sheet holding members 64 and 63 are spaced from each other in the direction of travel of the radiation 32 and the stimulable phosphor sheet 40 can be selectively carried in first to third carrying-in positions 67, 66 and 65 respectively between the front sheet holding member 64 and the first grid 61, between the first and second grids 61 and 62 and between the second grid 62 and the rear sheet holding member 63.

Figure 4A:
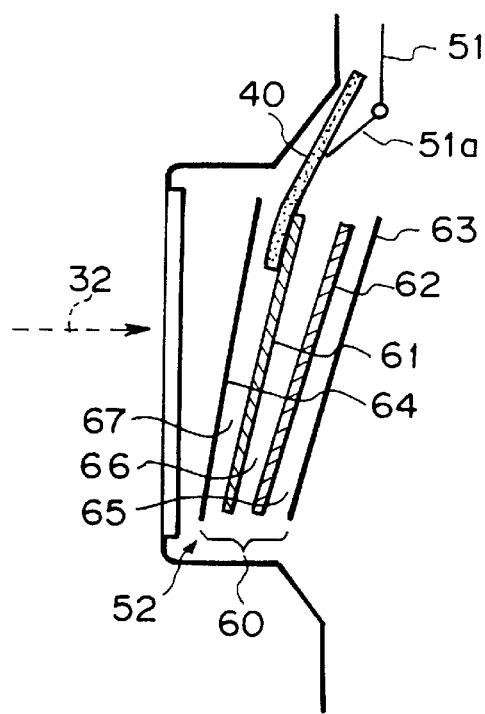
FIGS. 4A to 4C are views illustrating the manner of changing the relative position of the grids and the stimulable phosphor sheet.
Figure 4B:
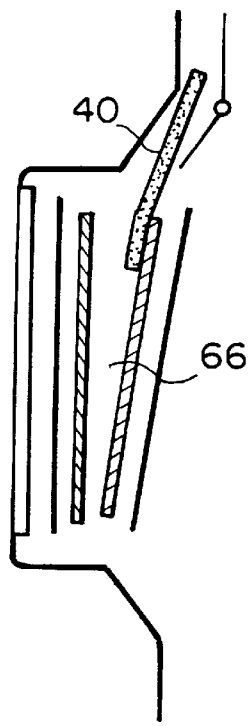
Figure 4C:
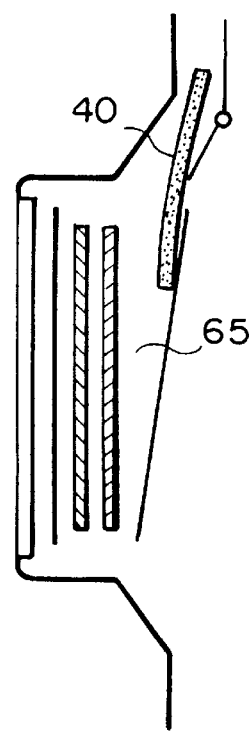

The image recording section 52 is further provided with selective guide means 51a and 51b which guide the stimulable phosphor sheet 40 into selected one of the carrying-in positions 67, 66 and 65 and out of the selected carrying-in position. The selective guide means 51a and 51b are driven in response to operation of a selection button or the like (not shown). For example, when the object is one which scatters a relatively small amount of radiation 32, the operator pushes a selection button (not shown) corresponding to such an object and the selective guide means 51a is moved to a position where it guides the stimulable phosphor sheet 40 into the first carrying-in position 67 as shown in FIG. 4A. When the object is one which scatters a relatively large amount of radiation 32, the operator pushes a selection button (not shown) corresponding to such an object and the selective guide means 51a is moved to a position where it guides the stimulable phosphor sheet 40 into the second carrying-in position 66 as shown in FIG. 4B. When the object is one which scatters a large amount of radiation 32, the operator pushes a selection button (not shown) corresponding to such an object and the selective guide means 51a is moved to a position where it guides the stimulable phosphor sheet 40 into the third carrying-in position 65 as shown in FIG. 4C.

The selective guide means 51b is displaced, when the stimulable phosphor sheet 40 is discharged from image recording section 52, into a position corresponding to the carrying-in position where the stimulable phosphor sheet 40 has been held and guides the stimulable phosphor sheet 40 to smoothly discharge it from the image recording section 52.

Figure 3:
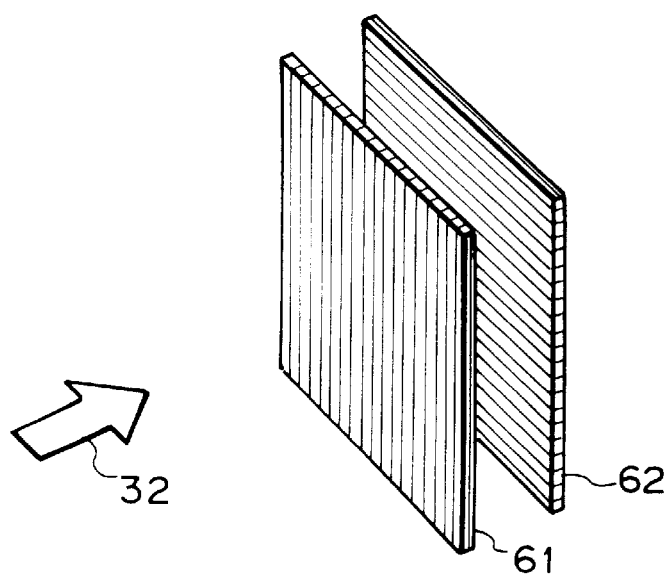
FIG. 3 is a view showing the arrangement of the first and second grids.

Each of the grids 61 and 62 is in the form of a plate which has a certain thickness and comprises 1) a plurality of strip-like regions which are formed of a material such as aluminum which prevents passage of scattered radiation and are of a width substantially equal to that of one picture element; and 2) a plurality of strip-like regions which are formed of a material such as carbon, which is apt to transmit the radiation and are of a width substantially equal to that of one picture element, the two kinds of strip-like regions being arranged alternately. The first and second grids 61 and 62 are positioned so that the strip-like regions of one of the grids extend substantially perpendicular to those of the other grid as shown in FIG. 3.

The operation of the radiation image recording and reproducing system 50 of this embodiment will be described, hereinbelow. Assuming that the object 21 is one (FIG. 2) which scatters a relatively small amount of radiation 32, e.g. a limb of a human body, the operator pushes a selection button (not shown) corresponding to the object 21. Then conveyor means 51 conveys the stimulable phosphor sheet 40 to the image recording section 52 along the predetermined circulation passage. In the image recording section 52, the sheet holding members 63 and 64 and the grids 61 and 62 have been rotated in the clockwise direction about their lower edges so that the spaces between their upper ends are opened wide while the selective guide means 51a has been displaced to a position corresponding to the selection button pushed, whereby the stimulable phosphor sheet 40 is conveyed to the first carrying-in position 67 between the front sheet holding member 64 and the first grid 61 as shown in FIG. 4A.

Thereafter the sheet holding members 63 and 64 and the grids 61 and 62 are rotated in the counterclockwise direction about their lower ends, whereby the stimulable phosphor sheet 40 is erected sandwiched between the front sheet holding member 64 and the first grid 61 on standby for recording as shown in FIG. 2. In this state, the radiation source 30 is operated to project radiation 32 onto the stimulable phosphor sheet 40 through the object 21. At this time, since no grid intervenes between the object 21 and the stimulable phosphor sheet 40, radiation image information including scattered radiation is stored on the stimulable phosphor sheet 40.

However since the object 21 scatters a relatively small amount of radiation, influence of the scattered radiation on the radiation image information thus stored on the stimulable phosphor sheet 40, is small.

After the end of the recording, the sheet holding members 63 and 64 and the grids 61 and 62 are rotated in the clockwise direction about their upper ends so that the spaces between their lower ends are opened wide, whereby the stimulable phosphor sheet 40 is released from the front sheet holding member 64 and the first grid 61 and is discharged downward from the first carrying-in position 67 under the guidance of the selective guide member 51b.

The stimulable phosphor sheet 40 discharged from the image recording section 52 is conveyed to the image read-out section 53 along the circulation passage by the conveyor means 51. In the image read-out section 53, stimulating light emitted from the stimulating light source 55 scans the stimulable phosphor sheet 40 and the stimulable phosphor sheet 40 emits light in proportion to the amount of energy stored thereon during its exposure to the radiation. The light emitted by the stimulable phosphor sheet 40 upon stimulation thereof by the stimulating light is photoelectrically read out, thereby obtaining an electrical image signal representing the radiation image of the object 21. The image signal is input into an image processing system and the like (not shown) and subjected to a predetermined image processing. A visible image is reproduced on an image display system, a photosensitive material or the like on the basis of the processed image signal.

Thereafter the stimulable phosphor sheet 40 is conveyed to the erasing section 54 along the circulation path by the conveyor means 51. In the erasing section 54, residual radiation energy remaining on the stimulable phosphor sheet 40 after read-out of the radiation image is released so that another radiation image can be recorded on the stimulable phosphor sheet 40.

When the object is one which scatters a relatively large amount of radiation 32, the operator pushes a selection button (not shown) corresponding to the object. Then conveyor means 51 conveys the stimulable phosphor sheet 40 to the image recording section 52 along the predetermined circulation passage. In the image recording section 52, the front sheet holding member 64 and the first grid 61 have been kept erected and the second grid 62 and the rear sheet holding member 63 have been rotated in the clockwise direction about their lower edges so that the space between the upper ends of the first and second grids 61 and 62 is opened wide while the selective guide means 51a has been displaced to a position corresponding to the selection button pushed, whereby the stimulable phosphor sheet 40 is conveyed to the second carrying-in position 66 between the first and second grids 61 and 62 as shown in FIG. 4B.

Thereafter the second grid 62 and the rear sheet holding member 63 are rotated in the counterclockwise direction about their lower ends, whereby the stimulable phosphor sheet 40 is erected sandwiched between the first and second grids 61 and 62 on standby for recording. In this state, the radiation source 30 is operated to project radiation 32 onto the stimulable phosphor sheet 40 through the object. At this time, since the first grid 61 intervenes between the object and the stimulable phosphor sheet 40, radiation scattered by the object is prevented from impinging upon the stimulable phosphor sheet 40 by the first grid 61 and accordingly radiation image information only born by the radiation passing straight through the object is stored on the stimulable phosphor sheet 40. Accordingly a visible image of high contrast can be reproduced.

The operation after the recording is the same and will not be described here.

When the object is one which scatters a large amount of radiation 32, e.g., the chest of a human body, the operator pushes a selection button (not shown) corresponding to the object. Then conveyor means 51 conveys the stimulable phosphor sheet 40 to the image recording section 52 along the predetermined circulation passage. In the image recording section 52, the front sheet holding member 64 and the first and second grids 61 and 62 have been kept erected and the rear sheet holding member 63 have been rotated in the clockwise direction about its lower edge so that the space between the upper ends of the second grid 62 and the rear sheet holding member 63 is opened wide while the selective guide means 51a has been displaced to a position corresponding to the selection button pushed, whereby the stimulable phosphor sheet 40 is conveyed to the third carrying-in position 65 between the second grid 61 and the rear sheet holding member 63 as shown in FIG. 4C.

Thereafter the rear sheet holding member 63 is rotated in the counterclockwise direction about its lower end, whereby the stimulable phosphor sheet 40 is erected sandwiched between the second grid 62 and the rear sheet holding member 63 on standby for recording. In this state, the radiation source 30 is operated to project radiation 32 onto the stimulable phosphor sheet 40 through the object. At this time, since the first and second grids 61 and 62 intervene between the object and the stimulable phosphor sheet 40, radiations scattered by the object are prevented from impinging upon the stimulable phosphor sheet 40 by the first and second grids 61 and 62, and accordingly radiation image information only born by the radiation passing straight through the object is stored on the stimulable phosphor sheet 40. Accordingly a visible image of high contrast can be reproduced.

The operation after the recording is the same and will not be described here.

As can be understood from the description above, in the radiation image recording and reproducing system 50 of this embodiment, recording with use of a grid and that without use of a grid can be easily switched from one to the other without mounting and removing the grid.

In the embodiment described above, the amount of scattered radiation is divided into three classes and the relative position of the grid and the stimulable phosphor sheet is switched among three states, in one state no grid intervening between the object and the stimulable phosphor sheet, in another state one grid intervening therebetween and in the other state a pair of grids intervening therebetween. However the relative position of the grid and the stimulable phosphor sheet may be switched between two states, in one state no grid intervening between the object and the stimulable phosphor sheet and in the other state one grid intervening therebetween. In this case, the first or second grid may be removed from the arrangement of the embodiment described above or the first and second grids may be integrated in the arrangement of the embodiment described above.

In the case of the radiation image information recorded with one or more grids intervening between the object and the stimulable phosphor sheet, it is preferred that a processing for preventing generation of moire be carried out in addition to the image processing carried out by the image processing system or the like.

Figure 5:
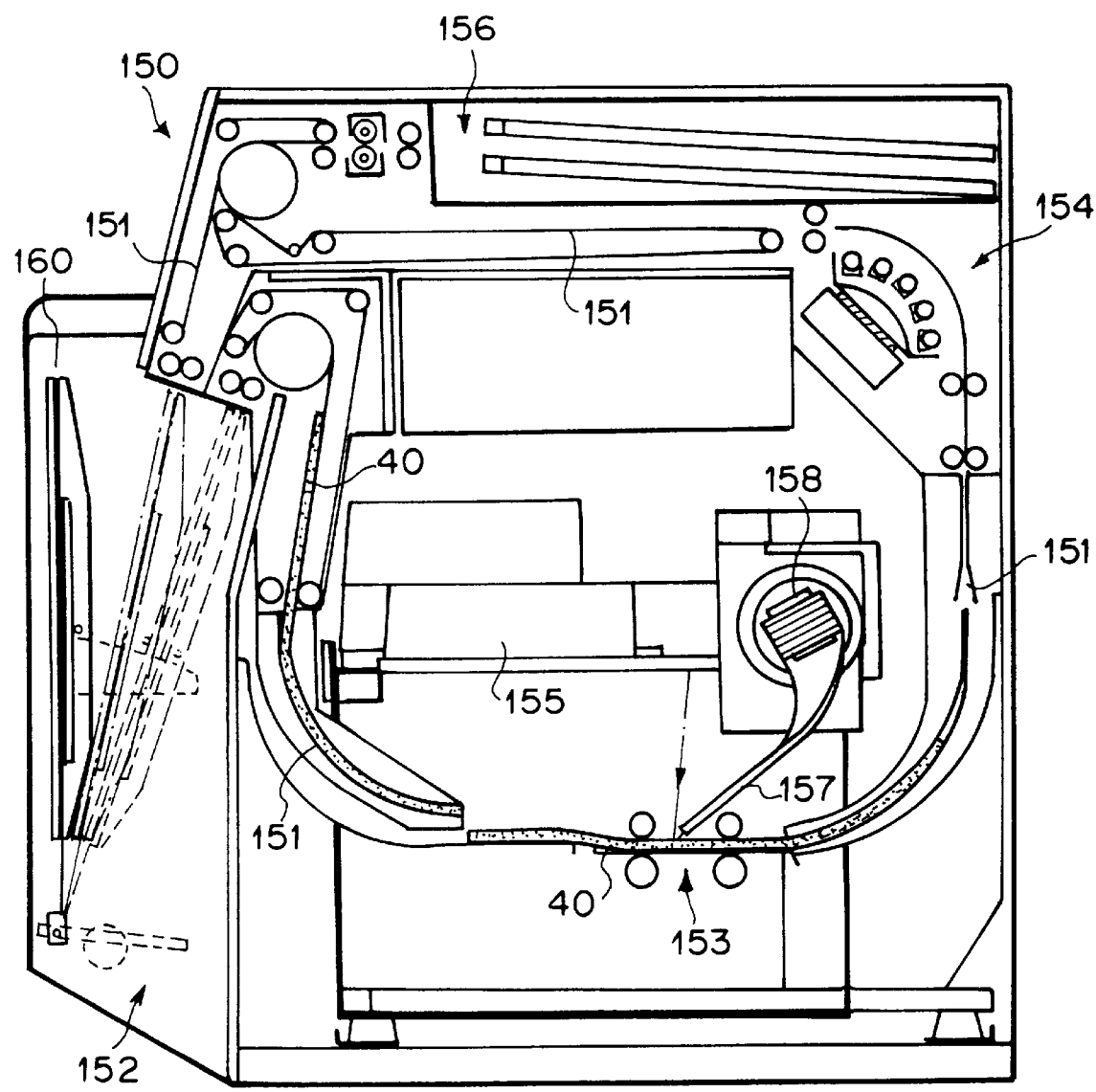
FIG. 5 is a schematic view showing a radiation image recording and reproducing system in accordance with another embodiment of the present invention.

Though, in the radiation image recording and reproducing system of the embodiment described above, the stimulable phosphor sheet is carried in the image recording section from above and discharged downward therefrom, the present invention can be applied to various radiation image recording and reproducing systems having different structures. For example, the present invention can be applied to a radiation image recording and reproducing system 150 shown in FIG. 5 which comprises a conveyor means 151, an image recording section 152, an image readout section 153, an erasing section 154 and a stacker 156, and in which the stimulable phosphor sheet 40 is carried in the image recording section 152 from above and discharged upward therefrom. In the system shown in FIG. 5, the sheet receiving section 160 is rotated among three positions in which the sheet is carried in the image recording section 152, is exposed to radiations, and is discharged from the image recording section 152, respectively.

What is claimed is:

1. A radiation image recording and reproducing system comprising:

conveyor means which conveys a stimulable phosphor sheet along a predetermined circulation passage;

an image recording section which is disposed in the circulation passage and records a radiation image of an object on the stimulable phosphor sheet by exposing the stimulable phosphor sheet to radiation through the object;

an image read-out section which is disposed in the circulation passage and comprises a stimulating light source for emitting stimulating light which scans the stimulable phosphor sheet having been exposed to said radiation to cause it to emit light in proportion to an amount of energy stored thereon during its exposure to the radiation, and a photoelectric read-out means which reads out the light emitted by the stimulable phosphor sheet upon stimulation thereof by the stimulating light, thereby obtaining an electrical image signal representing a radiation image of the object; and an erasing section which is disposed on the circulation passage and releases residual radiation energy remaining on the stimulable phosphor sheet after read-out of the radiation image and before another radiation image is recorded thereon;

at least one grid provided in the image recording section, and a relative position changing means which changes a position of the stimulable phosphor sheet in the image recording section relative to said at least one grid with respect to the projecting direction in which said radiation is projected onto the stimulable phosphor sheet upon recording of the radiation image of the object, such that depending on an amount of radiation scattered by said object which impinges on said stimulable phosphor sheet during image recording, said image recording is performed by one of using and without using said grid, and without one of mounting and removing said grid.

2. A radiation image recording and reproducing system as defined in claim 1, in which said image recording section has two or more carrying-in positions of the stimulable phosphor sheet and the relative position changing means includes a selection means which selects one of the carrying-in positions.

3. A radiation image recording and reproducing system as defined in claim 1, in which said relative position changing means changes the position of the stimulable phosphor sheet in the image recording section relative to said at least one grid according to an amount of scattered radiation.

4. A radiation image recording and reproducing system as defined in claim 1, in which there are provided a pair of grids each comprising a plurality of strip-like regions which prevent passage of radiation and a plurality of strip-like regions which are apt to transmit the radiation, the two kinds of strip-like regions being arranged alternately, and the grids are positioned so that the strip-like regions of one of the grids extend substantially perpendicular to those of the other grid.

* * * * *